United States Patent [19]

Horie

[11] Patent Number: 5,053,610
[45] Date of Patent: Oct. 1, 1991

[54] READING APPARATUS AND PHOTODETECTOR FOR OPTICAL RECORDING MEDIUM

[75] Inventor: Kiyoshi Horie, Yokohama, Japan
[73] Assignee: Kabushiki Kaisha CSK, Tokyo, Japan
[21] Appl. No.: 315,785
[22] PCT Filed: Jun. 13, 1988
[86] PCT No.: PCT/JP88/00566
§ 371 Date: Feb. 10, 1989
§ 102(e) Date: Feb. 10, 1989
[87] PCT Pub. No.: WO88/09989
PCT Pub. Date: Dec. 15, 1988
[51] Int. Cl.$^5$ .......................... G11B 7/00; H01L 27/14
[52] U.S. Cl. ..................... 235/454; 235/470; 369/44.41; 250/208.6
[58] Field of Search ............. 235/454, 470, 494, 487; 369/44.11, 44.41, 44.42; 250/201.5, 208.6

[56] References Cited

U.S. PATENT DOCUMENTS

| | | | |
|---|---|---|---|
| 4,550,249 | 10/1985 | Damen et al. | 369/44.42 X |
| 4,787,075 | 11/1988 | Matsuoka et al. | 235/454 X |
| 4,797,868 | 1/1989 | Ando | 369/44.41 X |
| 4,816,665 | 3/1989 | Hsu | 250/208.6 X |
| 4,831,609 | 5/1989 | Suzuki | 235/454 X |
| 4,837,429 | 6/1989 | Umezawa et al. | 250/208.6 X |

Primary Examiner—Stuart S. Levy
Assistant Examiner—Steven M. duBois
Attorney, Agent, or Firm—Lackenbach Siegel Marzullo & Aronson

[57] ABSTRACT

A reading apparatus for reading an optical recording medium having a clock track, data tracks and a tracking guide line.

The apparatus comprises a photodetector which receives light images of the clock track, data tracks and tracking guide line; a clock detecting circuit which is responsive to a signal from the clock track by the photodetector to output a clock signal; data detecting circuit which encodes data read from the data tracks by the photodetector into a binary code in response to the clock signal; a focus error detecting circuit for detecting a focus error and a tracking error circuit for detecting a tracking error in response to a signal from the tracking guide line by the photodetector. The photodetector comprises first to fourth light-sensitive elements which receive a light image of the tracking guide line, a fifth light-sensitive element which receives a light image of the clock track and a sixth light-sensitive element which receives a light image of the data track.

With the compact arrangement of the photodetector, the reading apparatus is reduced in weight and size.

10 Claims, 6 Drawing Sheets

READING APPARATUS AND PHOTODETECTOR FOR OPTICAL RECORDING MEDIUM

TECHNICAL FIELD

This invention relates to a reading apparatus and a photodetector which are usable for an optical recording medium having a clock track, data tracks and a tracking guide line.

BACKGROUND ART

An optical recording medium, such as a card type optical memory or a disc type optical memory, which has a high density data recording capability and is capable of being carriable, has recently attracted the attention of many people.

In the optical recording medium such as a card type optical memory, recording is done by forming optically (or magnetooptically) changed states according to data to be recorded at discrete spots on the surface thereof, and then a light beam, such as a laser beam, is projected thereonto to read the changed states.

Specifically, fine unevenness or light and dark patterns are provided on a surface of the optical memory card onto which a light beam is projected to recognize the recorded data according to the difference of reflectivity, refractive index, or transmissivity of the medium to the projected light beam. Alternatively, the recording medium may be photothermo-magnetically recorded and the recorded data may be read depending upon the change of polarization of the projected light due to the magnetooptical effect.

The optical memory card has a clock track for enabling synchronization with data reading/writing and a tracking guide line functioning as a reference for a light beam from a reading optical system to accurately trace a track. The track and line are provided for each of the data track in the conventional optical memory card and juxtaposed each other.

Heretofore, optical signals are detected by separate detectors for reading the data and clock bits, for effecting tracking and focussing in the reading of the data on the optical recording medium as described above. With this system, the optical system should inevitably be large and it is difficult to reduce the size and weight of a reading apparatus.

DISCLOSURE OF THE INVENTION

It is therefore an object of the present invention to provide a reading apparatus for an optical recording medium which is capable of being reduced in size and weight by making a photodetector for the optical recording medium compact in structure.

A first invention features a reading apparatus for an optical recording medium having a clock line, data tracks and a tracking guide line, which apparatus comprises:

a photodetector which receives light images of the clock track, data tracks and tracking guide line;

a clock detecting circuit which is responsive to a signal from the clock track generated by the photodetector to output a clock signal;

data detecting circuit which encodes data read from the data tracks by the photodetector into a binary code in response to the clock signal; and a focus error detecting circuit for detecting a focus error and a tracking error detecting circuit for detecting a tracking error in response to a signal from the tracking guide line by the photodetector;

said photodetector being comprised of first to fourth light-sensitive elements which receive a light image of the tracking guide line, a fifth light-sensitive element which receives a light image of the clock track and a sixth light-sensitive element which receives a light image of the data track.

The first and the second light-sensitive element may be arranged in a line and said third and said fourth light-sensitive element are arranged in a line parallel with said line of the first and the second light-sensitive element in alignment with the first and the second element, respectively.

The fifth and the sixth light-sensitive element may be arranged in rows in a direction perpendicular to the parallel lines.

The clock track and the tracking guide line may be provided on the same line on the optical recording medium and said sixth light-sensitive element of the photodetector is disposed at a position which is surrounded by said first to fourth light-sensitive elements.

The first to the sixth light-sensitive element may be integrated on one substrate.

A second invention features a photodetector for use in the reading of data from an optical recording medium having a clock track, data tracks and tracking guide line, which photodetector comprises:

a first and a second light-sensitive element which are juxtaposed in a line;

a third and a fourth light-sensitive element which are juxtaposed in a line which is parallel with said line of the first and said second light-sensitive element so as to correspond to said first and said second light-sensitive element, respectively; and a fifth and a sixth light-sensitive element which are disposed outside of the two parallel lines;

said first to said fourth light-sensitive element being adapted to receive a light image of the tracking guide line, said fifth light-sensitive element being adapted to receive a light image of the data track and said sixth light-sensitive element being adapted to receive a light image of the clock track.

A plurality of fifth light-sensitive elements may be arranged in rows in a direction perpendicular to the two parallel lines.

The first to the sixth light-sensitive element may be integrated on one substrate.

The sixth light-sensitive element may be disposed at a position which is surrounded by the first to the fourth light-sensitive element.

BEST MODE FOR CARRYING OUT THE INVENTION

Embodiments of the present invention will now be described, while referring to the drawings. In the drawings, the same parts or portions are denoted by the same numerals. In the following, the description is made, referring to the scanning of an optical system with respect to the optical recording medium. However, the present invention may also be operative in such a system that the optical recording medium is scanned with respect to the optical system.

FIRST EMBODIMENT

Figure 2:
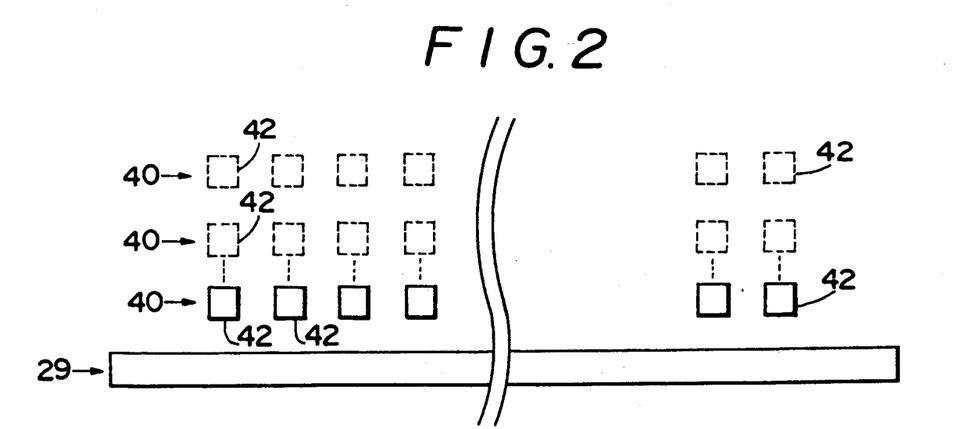
FIG. 2 is an explanatory view showing one form of a recording format of a card type optical recording medium which is usable in combination with the reading apparatus of the present invention.

FIG. 2 shows one example of a recording format for a card type optical recording medium or so-called optical memory card which is an example of optical recording media to which the reading apparatus of the present invention is applied. In this example, a plurality of data tracks 40 are juxtaposed for a tracking guide line 29. Each data track 40 is formed of a plurality of data bits 42. One of the data tracks 40 may be used as a clock track in which clock bits are recorded at equal intervals.

Figure 3:
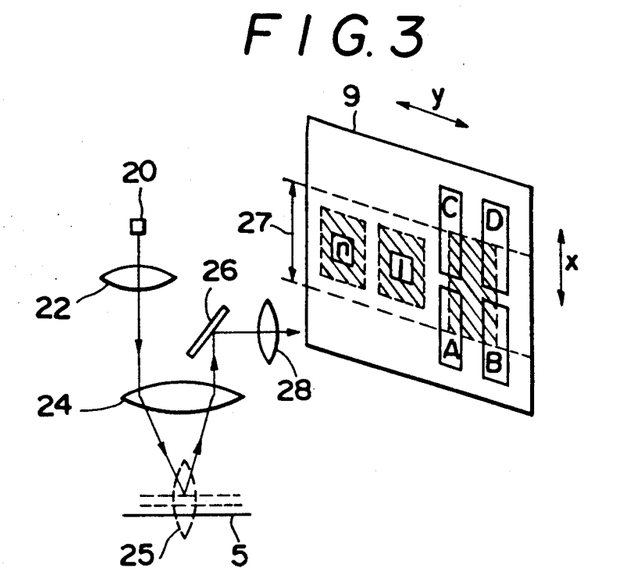
FIG. 3 is an explanatory view showing the reading apparatus for reading data on the card type optical recording medium of FIG. 2.

FIG. 3 is an explanatory view showing a principle of the reading apparatus for reading data recorded on an optical memory card 5 having the format as shown in FIG. 2.

In FIG. 3, light from a light source, i.e., light emitting diode 20 is confined into parallel beams by a collimator lens 22 and converged, by an objective lens, into an ellipse 25 in which one or more clock bits and plural data bits corresponding thereto on the reading surface of the optical memory card 5 are included. Light reflected from the card 5 is transmitted through the objective lens 24. The light source employable in the present embodiment is not limited to a light emitting diode. The present embodiment may employ plural light sources.

Light transmitted through the objective lens 24 is reflected by a reflector 26 towards an objective lens 28. This reflected light forms an enlarged image of light by the objective lens 28 within an image forming range 27 including an array of light-sensitive elements of the photodetector 9.

Figure 1:
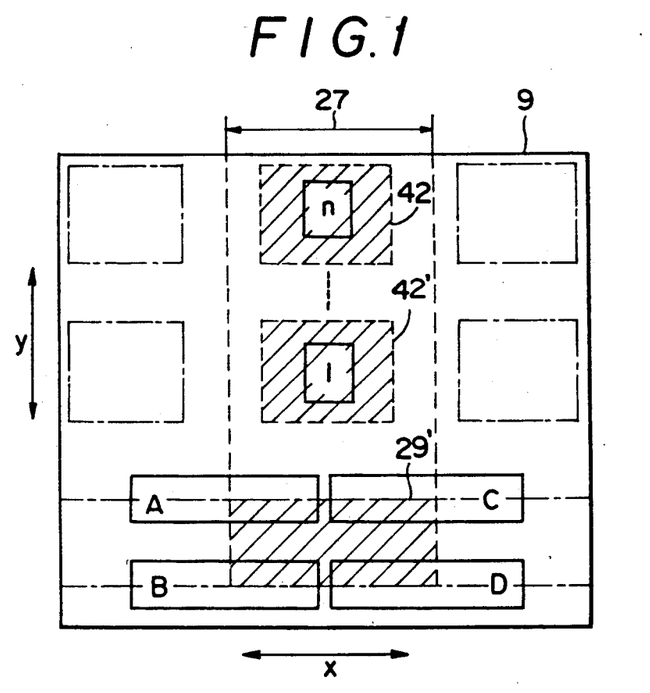
FIG. 1 is an enlarged front view of one form of a photodetector for use in a reading apparatus for an optical recording medium according to the present invention.

FIG. 1 is an enlarged front view of the photodetector 9. The photodetector 9 comprises light-sensitive elements A, B, C and D and n light-sensitive elements 1 to n which are integrated on a single substrate. Each of the light-sensitive elements may be a PIN photodiode, a charge-coupled device, etc. With a view to attaining a high-speed operation, the PIN photodiode is preferable.

In FIG. 1, the light-sensitive elements A and C, which are a first and a second element, respectively, are disposed in a direction x in which the image of light is moved relative to the optical memory card. The light-sensitive elements B and D, which are a third and fourth element, are disposed in the x direction in parallel with the first and second light-sensitive elements. The first to fourth light-sensitive elements A to D receive a light image 29' of the tracking guide line 29.

n Light-sensitive elements 1 to n which constitute a fifth element are arranged in rows in a y direction beside the light-sensitive elements A and C (or the light-sensitive elements B and D) to receive a light image 42' of the data bit 42 on the data track 40. The light images 29' and 42' move in the x direction within the image forming range 27 as the optical system scans in the track direction of the optical system. However, since the tracking guide line is continuous, the light image 29' always appears at a fixed position in the x direction so long as the focussing is in good order. In the figure, each of dot-dash-lines indicates a position where a light image will be formed if it is within an image forming range.

Figure 4:
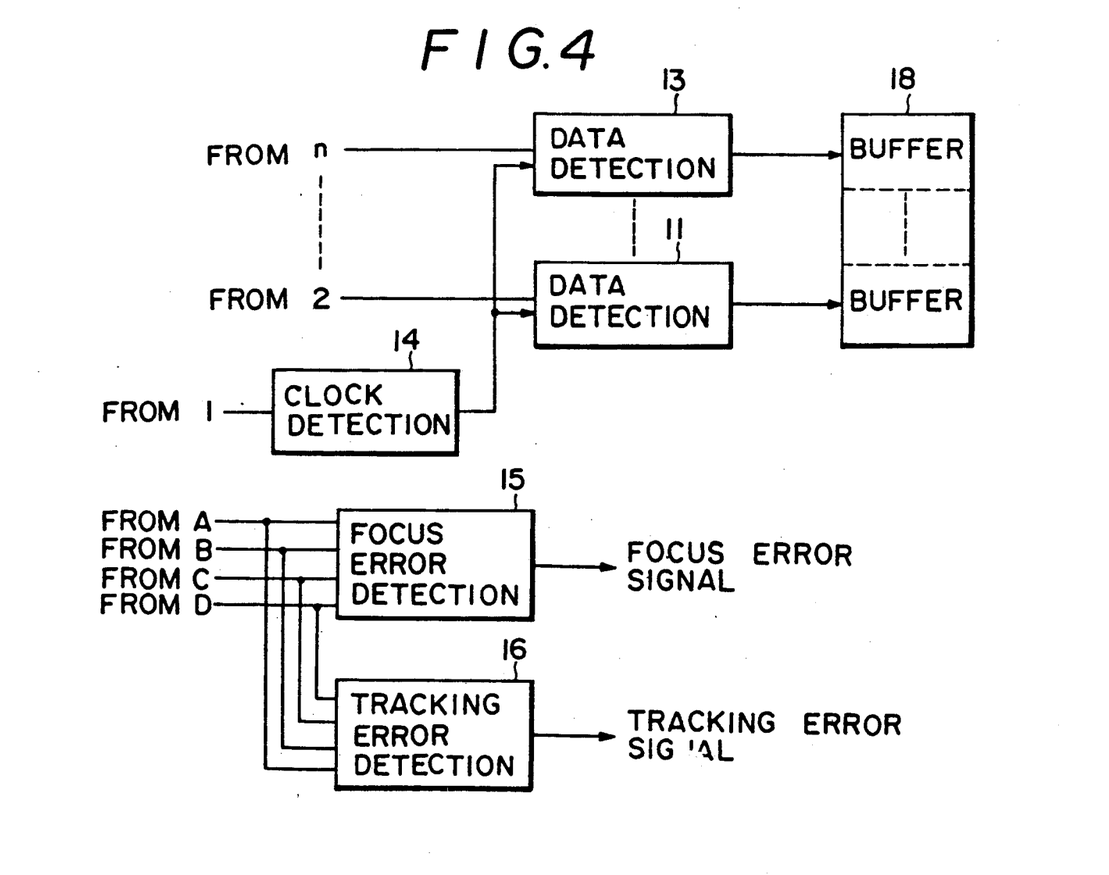
FIG. 4 is a block diagram of a processing unit for processing an output from the photodetector of FIG. 1.

FIG. 4 is a block diagram of a reading apparatus for processing an output from each of the light-sensitive elements of the photodetector 9 shown in FIG. 1. This apparatus comprises a clock detecting circuit 14 which is responsive to an output from the light-sensitive element 1 to encode it into a binary code for outputting a clock signal, data detecting circuits responsive to outputs from the light-sensitive elements 2 to n to encode the same into a binary code according to the clock signal; buffers 18 for storing these outputs, respectively, a focus error detecting circuit 15 which is responsive to outputs from the light-sensitive elements A to D to output a focus error signal to a focus control mechanism for the optical system, and a tracking error detecting circuit 16 which is responsive to outputs from the light-sensitive elements A to D to output a tracking error signal to a tracking control mechanism for the optical system.

Figure 5:
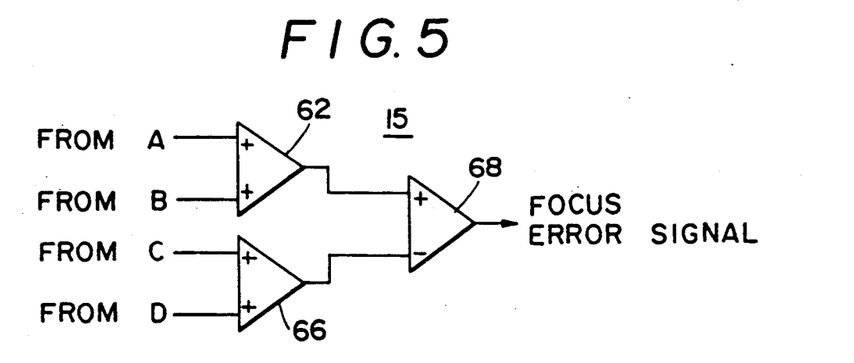
FIG. 5 is a block diagram of one form of a focus error detection circuit of FIG. 4.
Figure 6:
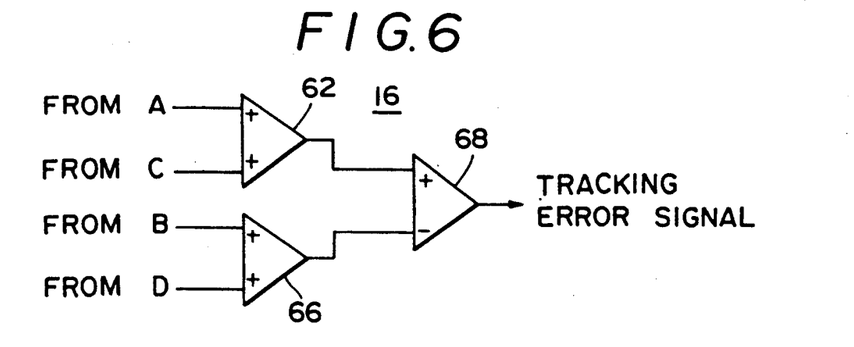
FIG. 6 is a block diagram of one form of tracking error detection circuit of FIG. 4.

FIGS. 5 and 6 show specific examples of the focus error detecting circuit 15 and the tracking error detecting circuit 16 shown in FIG. 4. Each of the focus error detecting circuit 15 and the tracking error detecting circuit 16 comprises summing amplifiers 62 and 66 and a differential amplifier 68 which receives outputs from the summing amplifiers 62 and 66. The circuits 15 and 16, however, differ from each other in that the summing amplifiers 62 and 66 receive outputs from different combination of light-sensitive elements. More particularly, in the focus error detecting circuit 15 of FIG. 5, the summing amplifier 62 receive outputs from the light-sensitive elements A and B and the summing amplifier 66 receive outputs from the light-sensitive elements C and D. In response to these outputs, the differential amplifier 68 outputs a focus error signal.

Whereas, in the tracking error detecting circuit 16 of FIG. 16, the summing amplifier 62 receives outputs from the light-sensitive elements A and C and the summing amplifier 66 receives outputs from the light-sensitive elements B and D. As a result of this, the differential amplifier 68 outputs a tracking error signal.

It will now be described how the focussing control and the tracking control are carried out, based on the outputs from the light-sensitive elements A to D.

With respect to the focussing control, when the focussing of light beam with respect to the optical memory card 5 is normal, the light system is so adjusted that the light image 29' formed on the surface of the photodetector 9 is situated equally over the light-sensitive elements A, B and the light-sensitive elements C, D. At this time, A+B=C+D (for convenience of explanation, the levels of the outputs of the light-sensitive elements A to D are expressed as A to D). Therefore, a focus error signal is not output from the focus error detecting circuit 15 of FIG. 5.

In this connection, it is to be noted that in an off-center focussing control, the position where light beam is reflected by the optical memory card 5 is deviated in a direction along the track when the focus is changed upon fluctuation in the distance between the object lens and the optical memory card 5. As a result of this, the light image 29' (to say more strictly, the image forming range 27) is also deviated in the x direction.

As a result of this, A+B will not be equal to C+D any more, so that the focus error detecting circuit 15 will generate a focus error signal. In response to the focus error signal, the object lens 24 is moved in an optical axis direction.

With respect to the tracking control, the light system is so adjusted that the light image 29' formed on the surface of the photodetector 9 is situated equally over the light-sensitive elements A, C and the light-sensitive elements B, D as illustrated in FIG. 1 when the tracking of light beam with respect to the optical card memory 5. At this time, A+C=B+D. Therefore, a tracking error signal is not generated from the tracking error detecting circuit 15 of FIG. 5.

However, when the tracking gets out of order, more specifically, when light beam is deviated with respect to the optical memory card 5 in a direction perpendicular to the track, the light image 29' formed on the surface of the photodetector 9 is also deviated in the y direction. As a result of this, A+C will not be equal to B+D any more, so that a tracking error signal is generated from the tracking error detecting circuit 15. In response to the tracking error signal, the position or the angle of the object lens 24 is controlled in a direction perpendicular to the track.

Figure 7:
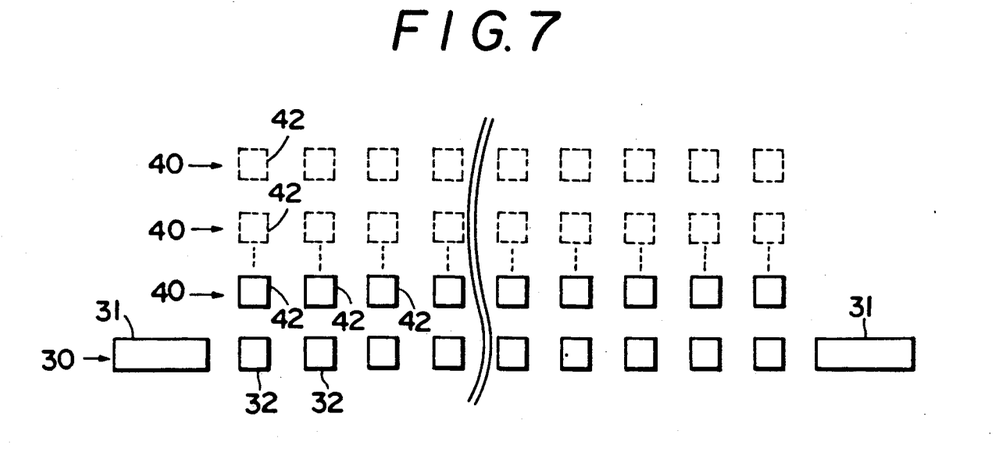
FIG. 7 is an explanatory view showing another form of a recording format of a card type optical recording medium.

FIG. 7 shows an example of a recording format for the card type optical recording medium which is applicable to the reading apparatus according to a second embodiment of the present invention as will be described later. This recording format may be used with the photodetector 9 of the first embodiment. This format differs from the format of FIG. 2 in that tracking guide line 30 is also used as a clock track.

The data bits 42 are recorded on the data track 40 at positions corresponding to the clock bits 32 of the clock track/guide line 30. The clock track 30 has, at its ends, read-in marks 31 to facilitate tracking at the start of reading as in the format of FIG. 2. The read-in mark 31 is made by forming plural clock bits without intervals.

Figure 8A:
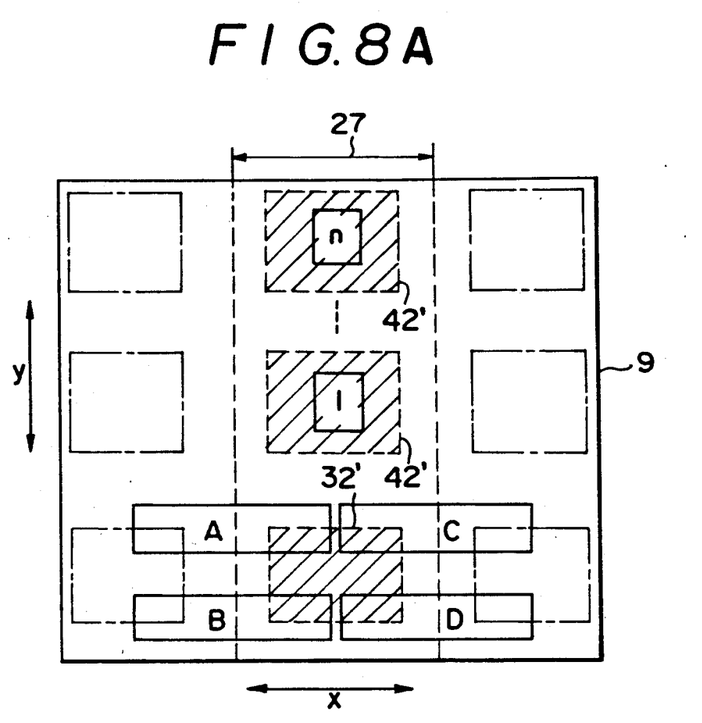
FIG. 8A and FIG. 8B are explanatory views showing operations when the photodetector of FIG. 1 is used with the optical recording medium of FIG. 7.
Figure 8B:
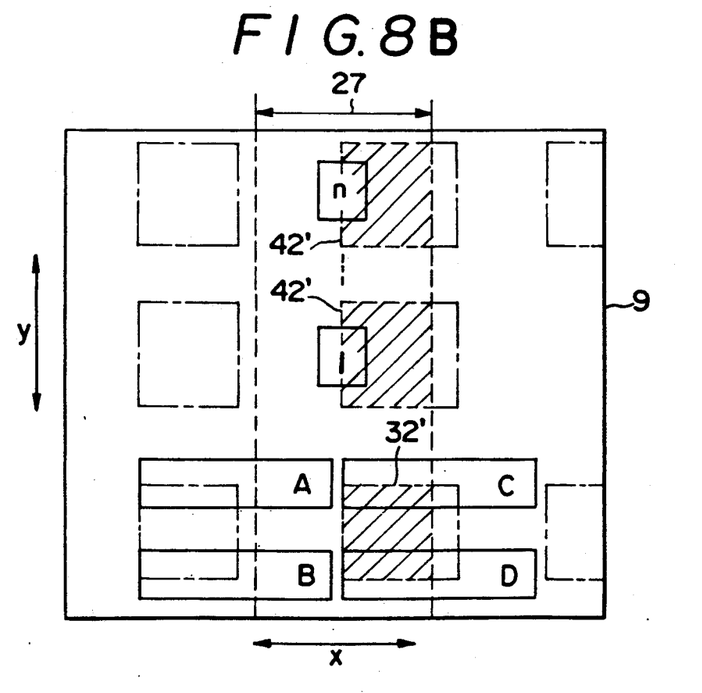

Light images 32' and 42' of the clock bit 32 and the data bit 42 of the optical memory card having the format of FIG. 4 on the photodetector 9 appear within its image forming range 27 as illustrated in FIG. 8A. In this connection, it is to be noted that since the clock track/guide line 30 of FIG. 7 is discontinuous, the light image 32' moves from its position of FIG. 8A to its position of FIG. 8B in the direction of the track together with the light image 42 as the optical system scans in the track direction. Therefore, in the format of FIG. 7, the focus error signal represented by (A+B)−(C+D) varies according to the scanning of the optical system even when the focussing is in good order. However, since fluctuation of the focussing is of a lower frequency than fluctuation of the focussing error signal, a low-pass filter (not shown) may further be provided on an output side of the differential amplifier 68 of the focus error detecting circuit 15 shown in FIG. 5 to solve the problem.

With respect to the tracking, since the tracking error signal is proportional to (A+C)−(B+D), there is no problem for the format of FIG. 7.

Since the photodetector 9 of FIG. 1 uses the light-sensitive elements A to D in common for error signal detection for both the focussing and the tracking and it is adapted to detect a plurality of data tracks at the same time, the detector may be constructed compact. As a result of this, the optical system may also be small-sized. In especial, if all the light-sensitive elements are integrated on one substrate, the small-sization is further enhanced. Besides, the characteristics of the elements can be uniform and the reading accuracy is further improved. (Second Embodiment)

Figure 9:
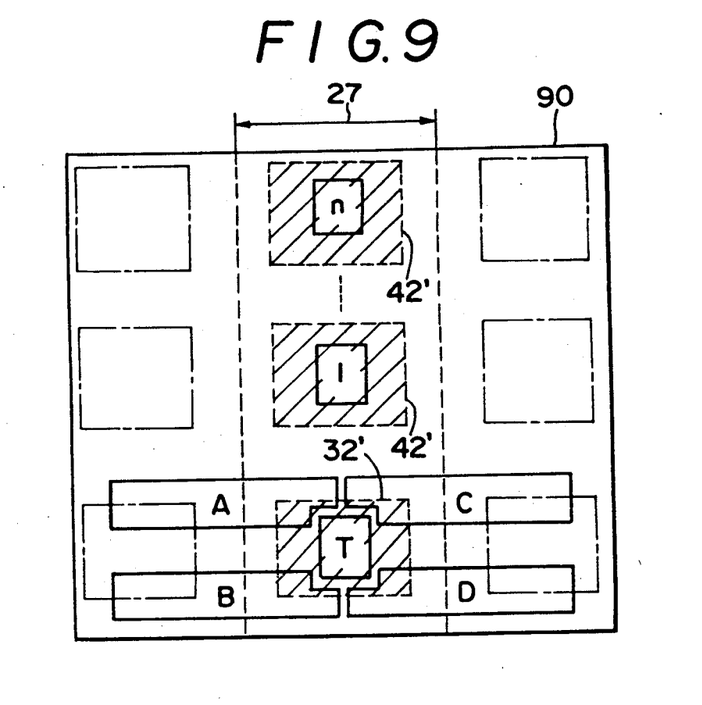
FIG. 9 is an enlarged front view of another form of a photodetector for use in the reading apparatus.
Figure 10:
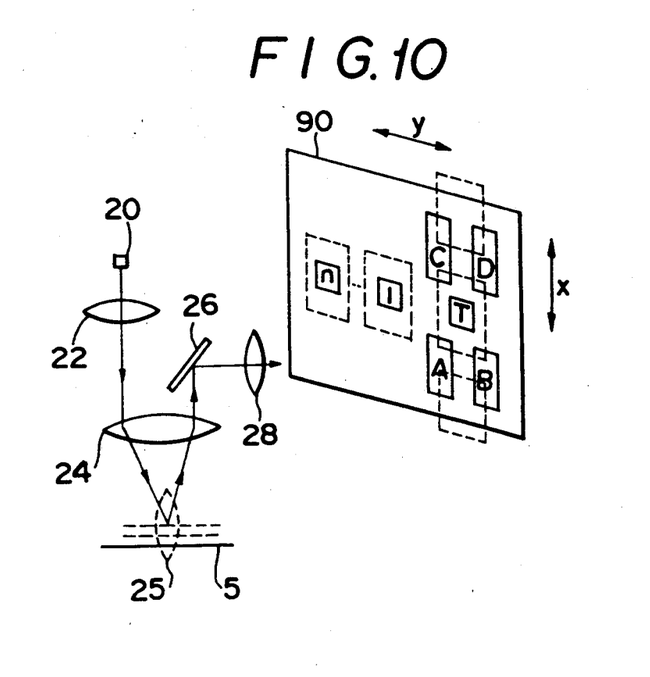
FIG. 10 is an explanatory view showing a reading apparatus for reading data on the card type optical recording medium of FIG. 7 with the photodetector of FIG. 9.

FIG. 9 illustrates a photodetector 90 for a reading apparatus according to a second embodiment. The photodetector 90 may suitably be used for the card type optical recording medium having the format of FIG. 7.

The photodetector 90 of FIG. 9 differs from the photodetector 9 of FIG. 1 in that a sixth light-sensitive element T is provided in a region surrounded by the light-sensitive elements A to D. The light-sensitive element T is for detecting the clock bit 32 of the clock track/guide line 30. More specifically, the light-sensitive element T detects a light image 32' of the clock bit 32 which moves in the direction of the track according to the scanning of the optical system.

Figure 11:
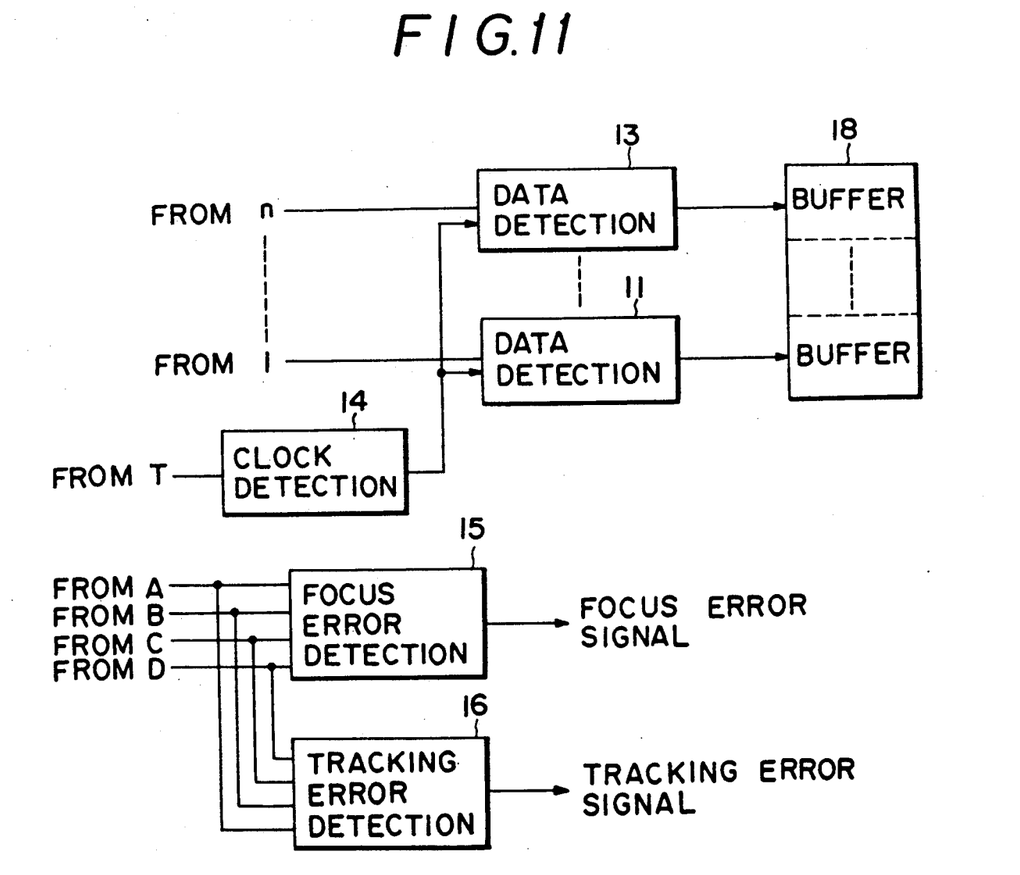
FIG. 11 is a block diagram of a processing unit for processing an output from the photodetector of FIG. 9.

The so obtained detection signal is encoded into a binary code by the clock detection circuit 14 as illustrated in FIG. 11 and supplied as a clock signal to the data detection circuits 11 to 13. Thus, all the tracks 40 in FIG. 7 can be utilized as data tracks.

The generation of the focus error signal and the tracking error signal according to the outputs from the light-sensitive elements A to D of the photodetector 90 and the focus control and the tracking control by the error signals are effected in manners as described above.

According to this embodiment, the light-sensitive element for detection of the clock bits is provided between the light-sensitive elements for focussing and tracking, so that the photodetector may further be made compact without reducing the number of the data tracks.

Although the optical memory card is used as an optical recording medium in the first and the second embodiment, the present invention may be applied to the reading for another type of optical recording media such as an optical disc.

We claim:

1. A reading apparatus for an optical recording medium having a clock line, data tracks and a tracking guide line, which apparatus comprises:

a photodetector which comprises first to fourth light-sensitive elements which receive a light image of the tracking guide line, a fifth-light sensitive element which receives a light image of said data track and a sixth light-sensitive element which receives a light image of said clock track;

a clock detecting circuit which is responsive to a signal from the clock track detected by the said sixth light-sensitive element to output a clock signal;

a data detecting circuit which encodes data read from the data tracks detected by said fifth light-senstitive element into a binary code in response to the clock signal;

a focus error detecting circuit for detecting a focus error and a tracking error detecting circuit for detecting a tracking error in response to a signal from the tracking guide line detected by said first to fourth light sensitive elements;

said first and said second light-sensitive elements being arranged in a line and said third and said fourth light-sensitive element being arranged in a line parallel with said line of the first and the second light-sensitive element in alignment with the first and the second element respectively, said focus error detecting circuit being comprised of a summing amplifier which receives the output from said first and third light-sensitive elements, a summing amplifier which receives the output from the said second and fourth light-sensitive elements and a differential amplifier which receives outputs from said amplifier, said tracking error detecting circuit being comprised of a summing amplifier which receives the output from the said first and second light-sensitive elements, a summing amplifier which receives the output from the said third and fourth light-sensitive elements and a differential amplifier which receives output from the said amplifiers.

2. A reading apparatus for an optical recording medium as claimed in claim 1, in which said fifth and said sixth light-sensitive element are arranged in rows in a line perpendicular to the parallel lines passing through the first and the second element.

3. A reading apparatus for an optical recording medium as claimed in claim 1, in which said sixth light-sensitive element of the photodetector detects a clock bit by receiving a light image of a tracking guide line combined with the clock track and is disposed at a position which is surrounded by said first to fourth light-sensitive elements and said first to fourth and sixth light-sensitive elements receive the light image of one clock bit at the same time.

4. A reading apparatus for an optical recording medium as claimed in any one of claims 1 to 3, in which said first to said sixth light-sensitive elements are integrated on one substrate.

5. A photodetector for use in the reading of data from an optical recording medium having a clock track, data tracks and tracking guide line, which photodetector comprises:

a first and second light-sensitive element which are juxtaposed in a line in a direction of a track;

a third and a fourth light-sensitive element which are juxtaposed in a line which is parallel with said line of the first and said second light-sensitive element so as to correspond to said first and said second light-sensitive element, respectively; and a fifth and a sixth light-sensitive element which are disposed in a line perpendicular to said two parallel lines passing through said first and second light-sensitive element;

wherein said first to said fourth light-sensitive elements are the means to receive a light image of the tracking guide line, said fifth light-sensitive element is the means to receive a light image of the data track and said sixth light-sensitive element is the means to receive a light image of the clock track.

6. A photodetector as claimed in claim 5, in which a plurality of fifth light-sensitive elements are arranged in rows in a direction perpendicular to the two parallel lines corresponding to the light image of plural data tracks.

7. A photodetector as claimed in claim 5 or 7, in which said first to said sixth light-sensitive element are integrated on one substrate.

8. A photodetector as claimed in claim 6 in which said sixth light-sensitive element is disposed at a position which is surrounded by the first to the fourth light-sensitive element.

9. A photodetector as claimed in claim 7, in which said sixth light-sensitive element is disposed at a position which is surrounded by the first to the fourth light-sensitive element.

10. A photodetector for use in the reading of data from an optical recording medium having a clock track, data tracks and tracking guide line, which photodetector comprises:

a first and a second light-sensitive element which are juxtaposed adjacent in a line in the direction of a track;

a third and fourth light-sensitive element which are juxtaposed adjacent in a line which is parallel with and spaced from said line of the first and said second light-sensitive elements so as to be adjacently be parallel to and correspond to said first and said second light-sensitive elements, respectively; and a fifth and a sixth light-sensitive element which are disposed in a common line perpendicular to the said two parallel lines passing through said first and second and third and fourth light-sensitive elements;

said first to said fourth light-sensitive elements being the means to receive a light image of the tracking guide line, said fifth light-sensitive element being the means to receive a light image of the data track and said sixth light-sensitive element being the means to receive a light image of the clock track, said sixth light-sensitive element being disposed at a position which is surrounded by the first to the fourth light-sensitive elements, and said fifth light-sensitive element being spaced from and adjacent said first to the fourth light-sensitive elements and separated from said sixth light-sensitive element by either the first and second light-sensitive elements or the third and fourth light-sensitive elements.

* * * * *